(12) United States Patent
Broderick

(10) Patent No.: US 9,060,506 B2
(45) Date of Patent: Jun. 23, 2015

(54) INTERCHANGEABLE SCENT CARTRIDGE SYSTEM

(76) Inventor: Greg Broderick, Bend, OR (US)

( * ) Notice: Subject to any disclaimer, the term of this patent is extended or adjusted under 35 U.S.C. 154(b) by 580 days.

(21) Appl. No.: 13/348,605

(22) Filed: Jan. 11, 2012

(65) Prior Publication Data

US 2012/0193442 A1    Aug. 2, 2012

Related U.S. Application Data

(60) Provisional application No. 61/437,800, filed on Jan. 31, 2011.

(51) Int. Cl.
*A24F 25/00*  (2006.01)
*A01M 31/00*  (2006.01)

(52) U.S. Cl.
CPC .................. *A01M 31/008* (2013.01)

(58) Field of Classification Search
CPC .................. A61L 9/037; A61L 9/12
USPC ............. 239/49, 43, 51.5, 53, 54, 55
See application file for complete search history.

(56) References Cited

U.S. PATENT DOCUMENTS

| | | | | |
|---|---|---|---|---|
| 4,523,717 A * | 6/1985 | Schwab | | 239/56 |
| 5,307,584 A * | 5/1994 | Jarvis | | 43/1 |
| 5,746,019 A * | 5/1998 | Fisher | | 43/1 |
| 6,241,161 B1 * | 6/2001 | Corbett | | 239/58 |

* cited by examiner

*Primary Examiner* — Davis Hwu
(74) *Attorney, Agent, or Firm* — Donn K. Harms

(57) ABSTRACT

An interchangeable hunting scent cartridge system featuring a scent cartridge which has a scent body engaged thereon. The scent cartridge is engageable with any of a plurality of mounting components which may be adapted to engage a gun or a tree or other outdoor mounting positions where a scent is desirable. The scent cartridges may also be provided with solid covers allowing for storage when not in use and sale and provision of a plurality of differently scented cartridges each of which is engageable with any of the plurality of mounting components.

10 Claims, 6 Drawing Sheets

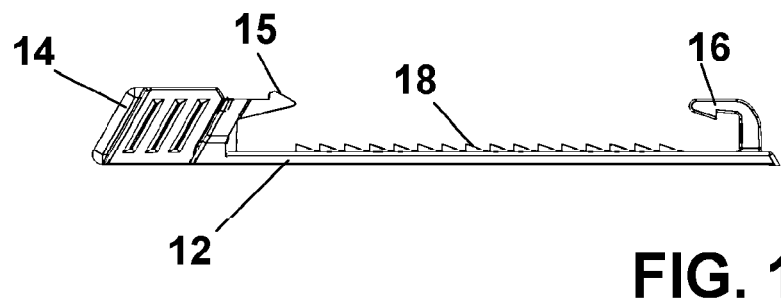
FIG. 1
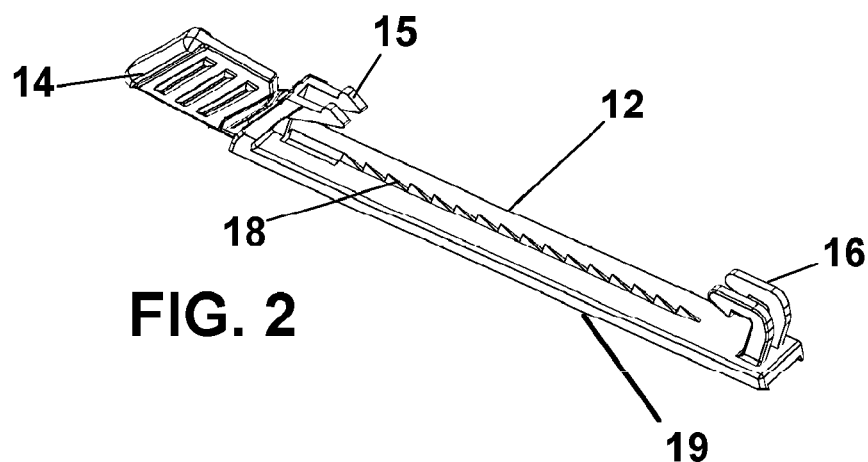
FIG. 2
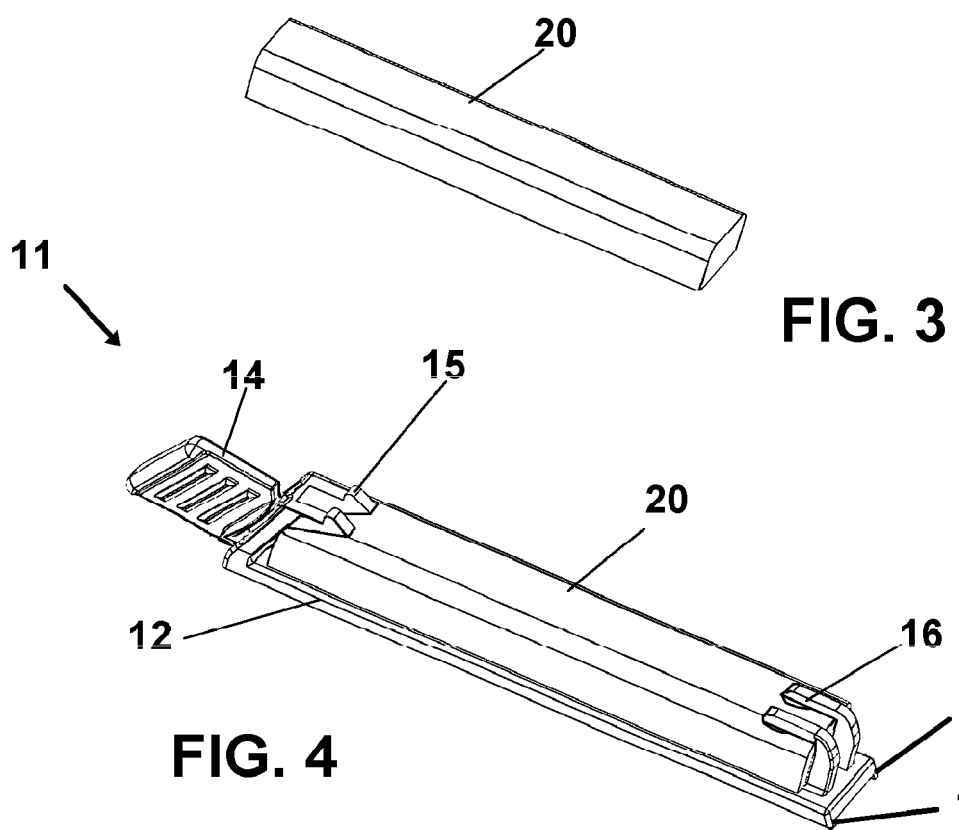
FIG. 3
FIG. 4

INTERCHANGEABLE SCENT CARTRIDGE SYSTEM

This application claims priority to Provisional Application No. 61/437,800, filed on Jan. 11, 2011, and incorporated herein by reference in its entirety.

BACKGROUND OF THE INVENTION

1. Field of the Invention

The present invention relates to scenting for activities such as hunting. More particularly, it relates to a system featuring a plurality of different scents for different purposes which are employable using interchangeable scent cartridges which engage a plurality of different holders for different mountings and purposes.

2. Prior Art

Modern, as well as primitive, hunting involves a tremendous amount of skill and strategy. In today's modern age, hunters utilize an almost endless amount of specialized weapons, tools, accessories, and other equipment to gain strategic advantage when hunting wild animals. However, even with advancements in technology, many of the basic hunting strategies still hold true.

One commonly known and widely employed strategy to increase success in hunting, involves masking ones own scent. Animals often have a keen sense of smell and can pick up on the human scent well before the animal is even seen. Since many game animals have learned to avoid humans, the hunter who fails to take scent into consideration risks the chance of success.

Consequently, hunters will often mask their own scent with the scent of the game they are hunting in order to make them 'invisible' to the game. Further, other scents can be employed to attract game, and can be very advantageous when used correctly. Still further, many hunters may desire to employ both human scent masking as well as game attracting scents to gain the utmost strategic advantage.

Conventionally, scents for attracting game or masking ones own scent are placed near a hunters hiding spot or other desired location such as on the user's body. They can be hung from trees, stuck in the ground, or tied to the trunks of trees. For masking their own human scent and further attracting game, hunters often scent their clothes or carry scent accessories on or near their bodies, often as clipped or attached to their belts, equipment, and so forth.

However, there is little in the market to allow hunters and other scent using individuals, to standardize their use, storage, and deployment of scents. Some conventional means to employ scents are wicks and sponges and rags which are dipped or sprayed with liquid scent bought in a container. The hunter will soak or coat these devices with a liquid scent, often an animal's urine or equivalent, and employ the device as needed. These methods are cheap and effective, but as can be discerned, using rags and sponges and liquid dips is often messy and difficult to handle. Further, if the user changes their clothes or position or type of game, a new scent setup must be engineered and the old one lost.

Prior art however, has shown attempts to allow a user to better employ masking or attractive scents. U.S. Pat. No. 5,611,165 to Blaha teaches a hunting scent holder with an absorbent material for carrying liquid animal scents enclosed within a container. The container is provided in either a closed stored position or an open as-used position for allowing ambient air to carry or waft the scent. The patent to Blaha can be configured to stake into the ground, or hang from a tree as desired. However, one can clearly see that the device to Blaha is bulky, and would not necessitate being comfortably engaged to a user's body when such scent strategies are desired. Furthermore, Blaha does not employ a convenient and quickly engageable means to change between different animal or attractive scents as needed for specific game hunting.

U.S. Pat. No. 6,241,161 to Corbett teaches a compact hunting scent container adapted to hold a predetermined amount of scent and is employable as a stake in the ground or can be hung from a tree. Further the device to Corbett may be engaged to a user's clothing by a string. However, Corbett as well as many other prior art hunting scents are limited in their use in that they do not easily necessitate interchangeability and storage as often desired by a user who may change position, tactics, and clothing. Further, when being hung from clothing as taught, Corbett and other devices can be cumbersome and even distracting, which is undesirable while hunting.

Many hunters find additional strategic advantage by engaging attracting and masking scents to their equipment as opposed to clothing, such as on their weapon. This may be desirable if the user employs a liquid animal urine and does not want potential direct contact of the liquid with their clothing or skin. In addition, the weapon is often kept close and will serve the same scenting purposes as direct contact with their clothing. Still further, engaging the scent device to their weapon will also alleviate the need to transport additional items on their bodies.

U.S. Pat. No. 6,810,614 to Phillips et al. teaches a device for mounting accessories to weapons such as a scent generating device. However, if a user feels that a scent is best employed at a clearing, tree, or other location as is strategically desired, the patent to Phillips does not teach a swift and easy means to disengage the scent from the weapon mounting device and engaged the scent on alternative mounting means. Furthermore, the mount of Phillips is limited to weapons mounting only and does not provide a means to mount the scent in aforementioned locations as well. Additionally, no easy manner to store one scent safely and engage another scent is provided by prior art.

As such, there is a continuing and unmet need for a system of components adapted for various mounting situations which can interchangeably engage the same scent cartridge. It should provide the user with the ability to interchangeably mount a standardized scent cartridge to a plurality of locations such as clothing and weapons, as well as various locations within the hunting environment such as the ground, a tree or other location, with each location employing its own specialized mounting device. Such a system should also employ a standardized scent cartridge adapted to fit a plurality of mounting devices to allow the user to move the scent cartridge about easily and to buy pre-scented cartridges which alleviate the need to soak or wet their cartridge and allow for easy purchase, storage and deployment of a plurality of different scents to different mounts for different purposes.

SUMMARY OF THE INVENTION

The device herein disclosed and described provides a solution for the above noted shortcomings in prior art through the provision of a standardized scent cartridge adapted for engagement to a plurality of different scented components. The cartridges are adapted for removable operative engagement with a plurality of different types of scent mounting components adapted for different locations and purposes.

It is preferred that such mounting components include specialized removable cartridge-engageable mounts for a plurality of locations such as weapons and other locations. Such weapon-adapted cartridge mounts can include, for instance, mounts adapted to engage one or a plurality of a gun, a crossbow, a bow and arrow, clothing, a ground stake, a tree trunk or tree limb, to name a few. However, since the cartridge is configured to engage in any such portable or moveable mounting point, the above noted engagements should not be limiting in any fashion.

In accordance with a preferred mode of the device, the scent cartridge component employs a fabric reservoir or means to carry a liquid or other type of scent through the provision of an absorbent material component. It is to be noted that the absorbent material can be any such absorbent material employable to hold and dissipate a scented liquid which will hold up to the portable nature of the mount and the rugged environment of outdoor deployment. Such material can include one or a combination of scentable fabrics from a group including sponge, cotton felt, wool felt, synthetic fabric felt, spunbonded absorbent fabric and other fabric or absorbent material adapted to hold a liquid scent and allow the liquid to evaporate over time.

An important aspect of the disclosed device is that the cartridge, and absorbent material engaged therein, are standardized in shape, dimension, and form to cooperatively and removably engaged with each other, and with any of a plurality of specialized mounting components adapted for engagement to outdoor and portable mounts as described above. By providing a standardized cartridge, the user can purchase pre-scented cartridges from vendors and alleviate the need to soak the absorbent material themselves. Such cartridges can be purchased knowing that they engage any of a plurality of scent disbursing mounts configured to engage them.

Standardization of the absorbent material components to fit the cartridge allows the user to easily and effectively engage a pre-scented or user-scented material component to a cartridge configured to hold it and to engage any of the plurality of mounts. This interchangeability of a single scent cartridge between multiple mounting devices and the ability to scent and use dry material components or buy pre-scented material components or entire assembled scent cartridges provides great utility to the user over the prior art of soaking rags and sponges and the like. Further, it allows for the prefabrication of an infinite number of cartridges which are pre-scented and sold in sealed containers for users who want to try something new without buying a gallon bottle of it, or who just like to keep their distance from the act of scenting material and hand-deploying it.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present standardized interchangeable scenting system and device. It is important, therefore, that the claims be regarded as including such equivalent construction and methodology insofar as they do not depart from the spirit and scope of the present invention.

It is an object of the invention to provide a system employing a standardized scent cartridge configured for a cooperative and removable engagement with any of a plurality of mounting components adapted to deploy the scent.

It is an object of the invention to provide such scent cartridges with pre-scented and operatively engaged absorbent material components employing a plurality of animal scents to provide great variety to users in purchasing and using scents.

It is another object of the invention to provide mounting means or components configured to engage in a plurality of outdoor environments and locations including but not limited to weapons, clothing, ground stakes, tree trunks, and tree limbs.

It is yet another object of the invention to provide hunting scents and means to mount the scents that are lightweight and easy to transport.

It is a further object of the invention to provide a system of cartridges and mounts that are easily manufactured, assembled, sold, and subsequently employed.

It is a further object of the invention to provide such scent cartridges which are engageable in, any of a plurality of scent airing mounts, which can be removed and engaged in a cover for storage and re-use.

BRIEF DESCRIPTION OF DRAWING FIGURES

FIG. 1 shows a side view of the standardized scent cartridge of the present invention.

FIG. 2 shows a perspective view of the standardized scent cartridge of the present invention.

FIG. 3 shows a perspective view of a typical absorbent material such as felt that carries the animal scent.

FIG. 4 is a perspective view of the absorbent material engaged within the cartridge.

DETAILED DESCRIPTION OF THE PREFERRED EMBODIMENTS OF THE INVENTION

Figure 5:
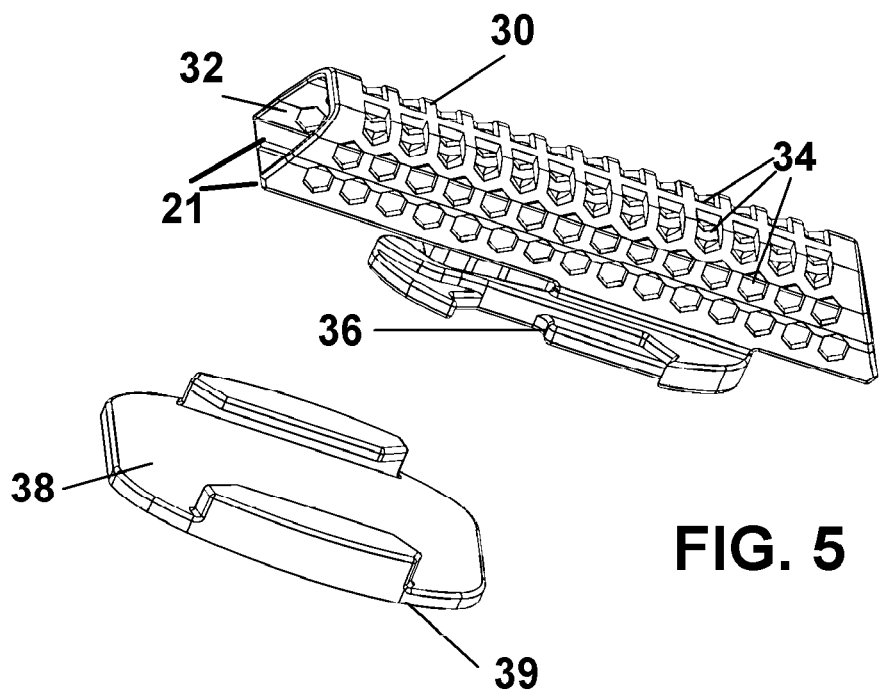
FIG. 5 show a view of a particularly preferred mode of the cartridge mount of the present invention employing a cartridge receiving cavity and removably engaged base element.

Now referring to drawings in FIGS. 1-14, wherein similar components are identified by like reference numerals, there is seen in FIG. 1 and FIG. 2 side and perspective views of the scent cartridge component 12 of the device 10. The scent cartridge component 12 is standardized in size, shape, and form to provide for a cooperative and removable engagement within complimentary configured receiving cavity 32 of any one of the plurality of mounts 30 which are to be described herein or would occur to those skilled in the art.

It must be noted that the scent cartridge component 12 and corresponding mounting component provided by the various described mounts having cooperative receiving cavities 32 of the present invention, may take a different shape or form than those shown in the figures as may be needed for feasible mass production and manufacture through conventional techniques such as plastic injection molding or the like. Further, while the mount 30 is depicted herein with a wall covering having apertures 34 herein communicating with the receiving cavity 32, it can also be a simple mount with no covering thereby exposing the absorbent material 20 to the air. The same sliding engagement with the insert 11 would be employed and this configuration would expose the absorbent material 20 to the air. As such, those skilled in the art will appreciate that the descriptions and depictions set forth are given merely to portray the utility and overall scope of the device 10 herein and should therefor not to be considered limiting in any manner.

As can be seen, the scent cartridge component 12 includes a gripping handle 14 at a distal end. The handle 14 will allow the user to easily grasp and hold the cartridge 12 as needed, such as with the thumb and forefinger, without the need or hazard of touching the absorbent material 20 providing the reservoir for scent material. As mentioned, the cartridge 12 is intended to engage and provide an evaporative mount for the absorbent material 20 which is impregnated with the desired scent. As shown, the cartridge 12 employs locking ridges 18 and tabs 15,16 in order to provide a secure removable engagement with the absorbent material 20. This allows the cartridge 12 to be sold with, or without the absorbent material 20 which can be added or changed if desired.

It is to be noted that the absorbent material 20, shown in FIG. 3, can be any material suitable for the intended purpose of being impregnated with a scent. As is shown, the absorbent material 20 is a substantially elongated body portion which provides the most effective elongated surface area to volume ratio, as needed to absorb a desired amount of liquid scent, and properly allow the ambient air to waft or other wise dissipate the liquid scent therein. However it is noted that those skilled in the art may, upon reading this disclosure, envision other various other shapes and forms of the absorbent material 20 that will provide effective and efficient dissipation of the operatively absorbed scent as is within the intended scope of the invention. As such, these other shapes and forms of the material 20 are anticipated within the scope of this patent.

An assembly to the as-used mode of the cartridge 12 and absorbent material 20 can be seen in FIG. 4. The material 20 is engaged within means for engagement to the cartridge 12 such as the depicted mounting tabs 15, 16 of the cartridge 12 providing secured engagement thereon. Additional secured engagement is provided by the ridges 18, which in the as-used mode, will extend into the material 20 to provide a means for eliminating slippage.

The assembly shown depicts a standardized and assembled removably engageable insert 11 of the device 10 intended for removable engagement within a cooperatively engageable receiving cavity 32 formed in any one of a plurality of mounting means or mounts disclosed herein or which those skilled in the art may discern upon reading this disclosure. In use, the absorbent material 20 is soaked or coated or otherwise impregnated with scent material or liquid such a animal scent, masking scent, animal pheromones, or other scent suitable for the intended purpose. Impregnation with scent material is done prior to or after engagement of the absorbent material 20 with the cartridge 12. Again, by providing a standardized cartridge 12 and absorbent material 20 in components or assemblies of engageable inserts 11, the user can easily and effectively interchange a single insert 11, between any one of multiple mounts or alternatively employ various scents within a plurality of different mounts.

FIG. 5 shows a particularly preferred means for mounting of the insert 11 of the device 10. The mount 30 is configured with the receiving cavity 32 configured to for a cooperative and removable engagement of the insert 11 which as noted includes the scent cartridge 12 and material 20. Currently favored in all forms of the mount with receiving cavity 32 and apertures herein are rails 19 formed on the cartridge 12 which are configured for cooperative engagement with receiving slots 21 running parallel to the axis of the mount 30, (such as FIG. 5 but all other depicted modes of the mount also) to provide a means for removable engagement which as depicted is slidable to allow removable insertion of the cartridge 12 into the cavity 32. One skilled will immediately recognize that surfaces of the mount 30 or receiving cavity 32 can additionally be of other standardized shapes and forms of complimentary engagement, to provide an easy engagement of the insert 11 to the mount 30 and allow repeated engagement and removal. Any such means for removable engagement allowing for removal and engagement of the cartridge 12 to the mount 30, in any of the forms of the mount depicted herein, is anticipated in the scope of this application.

There is shown a plurality of apertures 34 on the body of the mount 30, which communicate into the receiving cavity 32, to allow ambient air to communicate with the scented absorbent material 20 and waft the scent from the absorbent material 20 engaged to the cartridge 12 of the insert 11. The mount 30 in this mode is configured for a removable engagement with a base element 38 via clips 36 or other means for a removable engagement thereto, such as tongue and groove, or snap fits. The base element 38 employs means for removable attachment to a mounting surface such as an adhesive or hook and loop fabric (not shown), but well known, on the underside 39. As such the base element 38 may be permanently or temporarily engaged to a desired mounting surface while the mount 30 and operatively engaged insert 11 can be removably interchanged with the base 38 as desired.

Figure 5A:
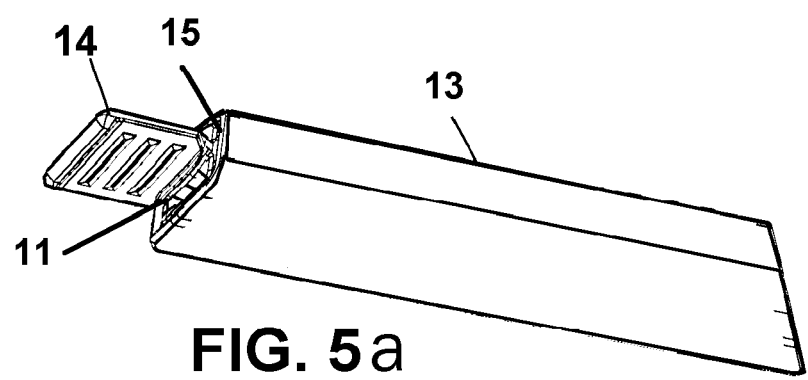

FIG. 5a shows the cartridge 12 and absorbent material 20 formed to an insert 11, engaged in a sealed engagement with solid-walled, air and moisture proof cover 13. The insert 11 is engaged into the sealed receiving cavity 32 formed within the cover 13 in a sealed engagement. A seal 15 may be employed such as O-rings or other means for sealing as would be needed and would be positioned to provide an operative sealed engagement of the cartridge 12 around the entrance aperture to the receiving cavity 32. This prevents evaporation of any scent material applied to the absorbent material 20. The cover 13 allows for removal of the cartridge 12 if mounted in one of the plurality of mounts 30, and storage for later use. Additional utility is provided in that the cartridges 12 can be pre-scented and placed in the sealed cover 13 for use by the user, or, manufacturers and other providers of scents mixtures can impregnate the absorbent material 20 of the cartridge 12 and engage the cover 13 to allow shipment and sale of the cartridge 12 with scents and easy purchase and deployment by the user who simply removes the cover 13 and engages the pre-scented cartridge 12 into any of the cooperatively engageable outdoor and portable mounts.

Figure 6:
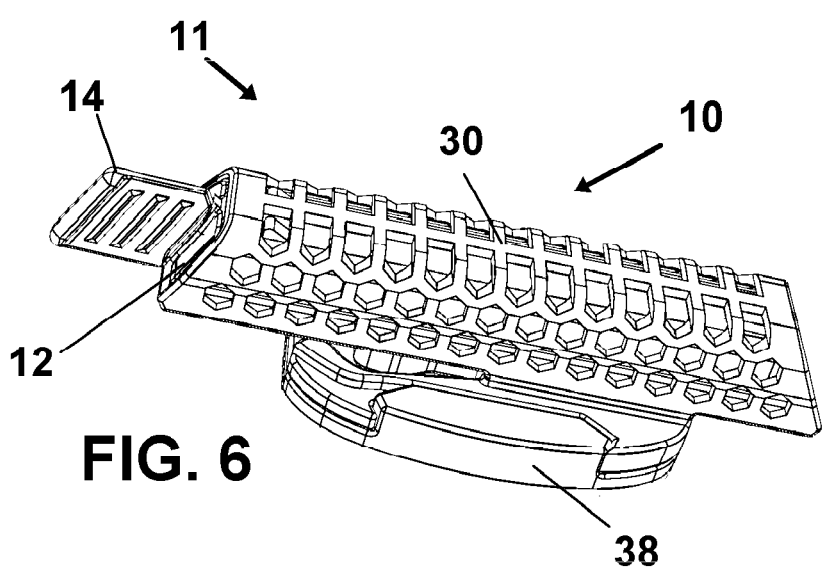
FIG. 6 is a view of the mode of the device in FIG. 5 with the scent cartridge engaged within the cavity of the mount and mount engaged to its base.

A mode of the device 10 in one complete assembly of the current preferred mode of the device 10 is seen in FIG. 6. As can be clearly seen, the gripping handle 14 of the cartridge 12 protrudes from a receiving cavity 32 easy grasping by the user and for insertion therein without touching the absorbent material 20.

Figure 7:
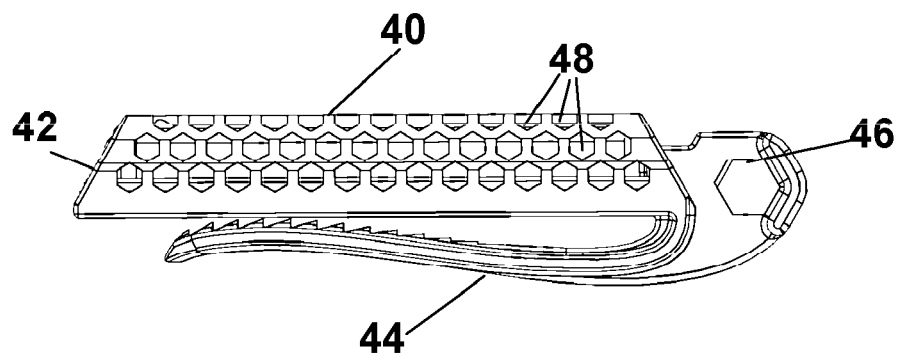
FIG. 7 shows a side view of another particularly preferred mode of the device employing a belt style clipping means.
Figure 8:
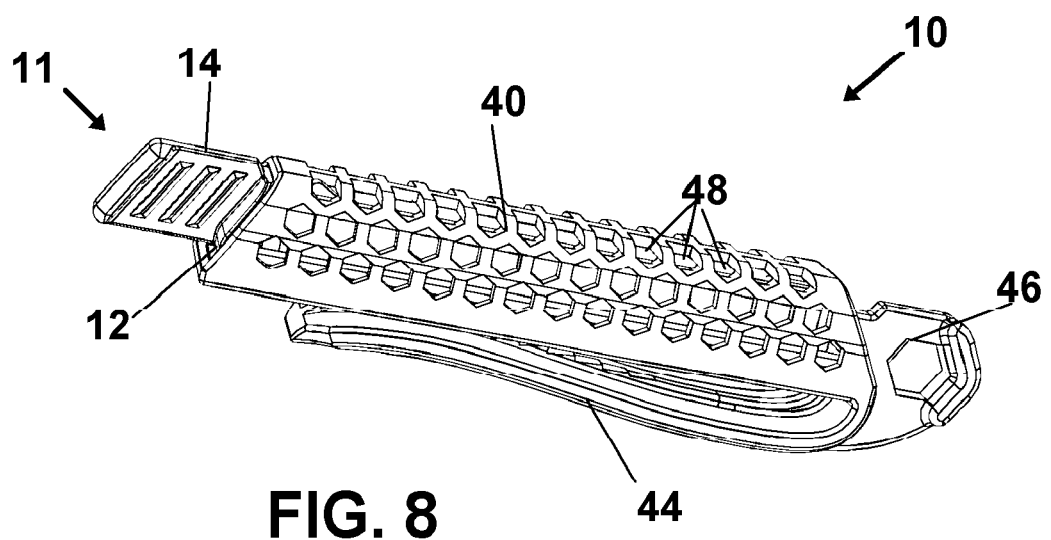
FIG. 8 is a perspective view of the mode of the device in FIG. 7 with the scent cartridge engaged within the receiving cavity of the device.

FIG. 7 show yet another particularly preferred mounting means of the device 10 showing a clip-on style mount 40. The clip-on mount 40 employs a biasing means such as a clip 44 to provide means for removable engagement to a belt, belt loop, fabric, or the like. Again there are a plurality of apertures 48 on the body of the mount 40 surrounding and communicating into the receiving cavity 42 to allow for dissipation of the scent into the ambient air. On one end there is seen a protruding aperture 46 which can be employed as means for removable engagement with a rope, string or similar material thereby providing a means for hanging the device 10 elevated in position. A perspective view of device 10 in the as used mode with the insert 11 operatively engaged therein can be see in FIG. 8.

Figure 9:
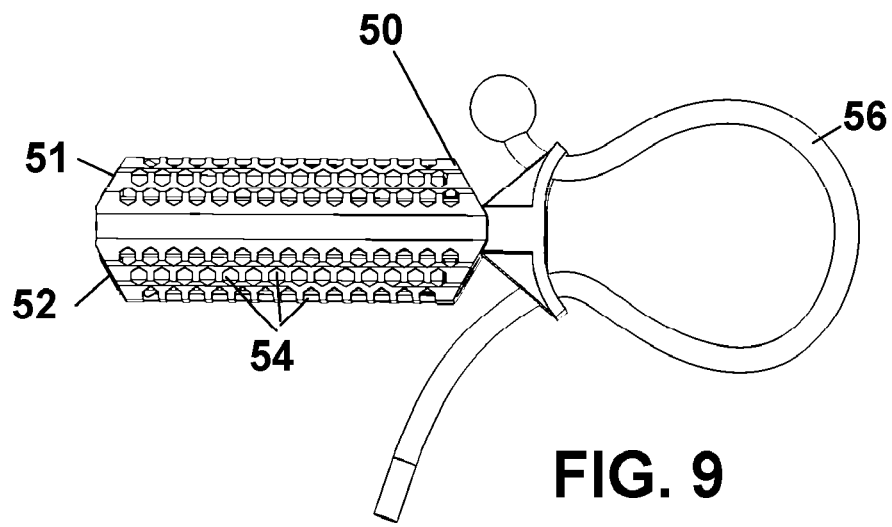
FIG. 9 shows a side view of yet another particularly preferred mode of the device that is engageable with two scent cartridges and employs a means to hang the device.
Figure 10:
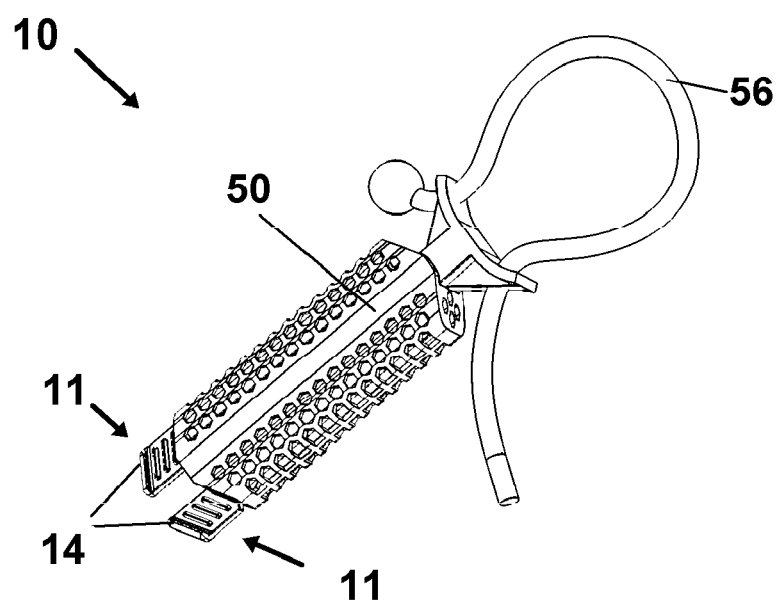
FIG. 10 is a perspective view of the device of FIG. 9 with scent cartridges engaged within the receiving cavities of the device.

Yet another particularly preferred mounting means of the device 10 can be seen in FIG. 9 showing a dual mount 50. The dual mount 50 of the present mode employs a first 51 and second 52 receiving cavity 32 for cooperative engagement with two insert components 11. A plurality of apertures 54 are employed once again to communicate scent on the absorbent material 20 within the receiving cavities 51,52. Furthermore the present mode can be seen employing a means for hanging the mount 50 from an overhanging tree branch or other location employing a means for removable securement to a member, such as a rope or string 56 as depicted. FIG. 10 shows the device 10 employing the current mount 50 in the as used mode with inserts 11 engaged within the dual receiving cavities 32 provided by first 51, and second 52 receiving cavities 32.

Figure 11:
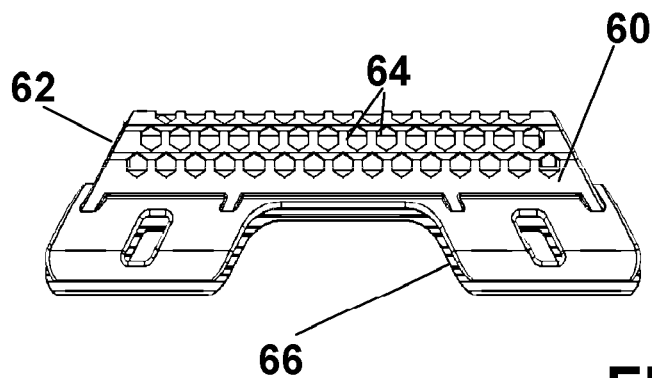
FIG. 11 is a side view of still yet another particularly preferred mode of the device that employs removable engagement means to a stake element (FIG. 14).

Still yet another particularly preferred mounting means of the device 10 can be seen in FIG. 11. The current cartridge mount 60 shown employs a means for removable engagement to an elongated body extending around an axis (such as a gun barrel or stake, not shown), through the provision of the arms 66 configured to provide an inward bias on engagement. In use the substantially rounded arms 66 provide a means for secured biased frictional engagement to a round body such as a gun barrel or stake in that distance between them is slightly smaller than the diameter of the elongated body engaged. A perspective and front view of the device 10 in the as used mode can be seen in FIGS. 12 and 13 respectively. Once again, in use the insert 11 including the scent cartridge 12 and material 20 is engaged within a receiving cavity 62 on the body of the mount 60 while apertures 64 provide a means to expose and dissipate the animal scent.

Figure 12:
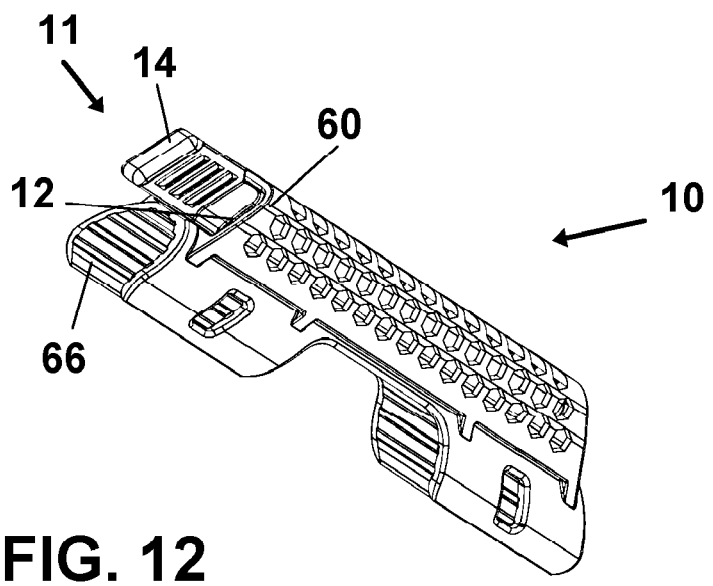
FIG. 12 shows a perspective view of the device of FIG. 11.
Figure 13:
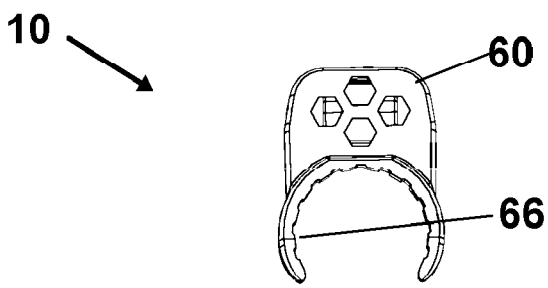
FIG. 13 is a front view of the device of FIG. 11.
Figure 14:
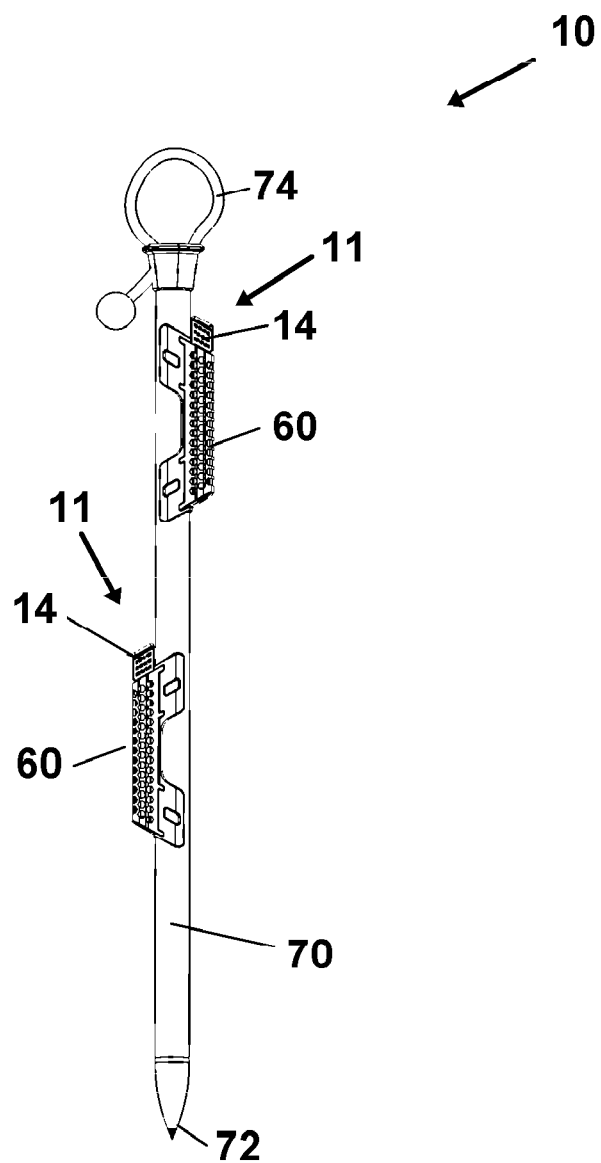
FIG. 14 shows the device of FIG. 11 removably engaged to a staking element.

FIG. 14 shows a preferred as-used position of the mode of the device 10 of FIGS. 11-13 employing an elongated member such as a stake component 70. One or a plurality of mounts 60 with inserts 11 engaged are shown cooperatively engaged to a stake 70. One distal end of the stake employs a pointed or sharpened element 72 for ease of insertion into the ground for mounting purposes. The opposite end is shown employing a means to hang or dangle the stake from a tree limb or other location if desired, such as a rope or string 74.

Finally, the device 10 in another mode which would provide great utility can be provided as a kit featuring a plurality of any of the disclosed mounts configured for engagement to a limb, a surface, or a firearm, herein allowing the user to pick the mount desired, and engage an insert 11 for use.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:
1. An interchangeable hunting scent cartridge system comprising:
   a scent insert having a cartridge;
   a scent body formed of material configured to provide a reservoir for scent material;
   means for engagement of said scent body, to said cartridge;
   a mounting component configured for an engagement with a mounting position;
   said mounting component having a receiving cavity surrounded by a wall having a plurality of apertures communicating therethrough with said receiving cavity;
   a sliding cooperative engagement of said insert within said receiving cavity providing means for removable engagement of said scent insert to an as-used position with said mounting component; and
   whereby said scent material can be imparted to said scent body, and said scent insert can be removably engaged with said mounting component to said as-used position, to provide communication of scent from said scent material to the surrounding air during outdoor use such as for hunting, and subsequently said scent insert can be removed and re-engaged multiple times from said mounting component as needed.

2. The interchangeable hunting scent cartridge system of claim 1 additionally comprising:
   a cover having a solid wall defining an internal cavity; and
   said insert slidably engageable to a sealed engagement within said cavity, whereby said insert is positionable for storage in said sealed cavity when removed from said as-used position engaged said mounting component.

3. The interchangeable hunting scent cartridge system of claim 1 additionally comprising:
   said insert engageable to said as-used position with each of a plurality of different said mounting components; and
   said insert positionable to said as-used position with any of said mounting components.

4. The interchangeable hunting scent cartridge system of claim 2 additionally comprising:
   said insert engageable to said as-used position with each of a plurality of different said mounting components; and
   said insert positionable to said as-used position with any of said mounting components.

5. The interchangeable hunting scent cartridge system of claim 3 additionally comprising:
   each of a plurality of different said mounting components having a mount interface adapted to engage one or a plurality of different said mounting surfaces; and
   said plurality of mounting surface including any one of a group of mounting surfaces including a gun barrel, a surface of a firearm, a tree limb, a stake configured for a ground engagement, and a rope.

6. The interchangeable hunting scent cartridge system of claim 4 additionally comprising:
- each of a plurality of different said mounting components having a mount interface adapted to engage one or a plurality of different said mounting surfaces; and
- said plurality of mounting surface including any one of a group of mounting surfaces including a gun barrel, a surface of a firearm, a tree limb, a stake configured for a ground engagement, and a rope.

7. The interchangeable hunting scent cartridge system of claim 2 additionally comprising:
- a plurality of said inserts each having a cover engaged thereon;
- any of said plurality of inserts positionable to said as-used position;
- each of said plurality of inserts having a respective said scent body impregnated with a different scent; and
- each of said plurality employable by a user desiring to employ a chosen respective scent in said as-used position.

8. The interchangeable hunting scent cartridge system of claim 3 additionally comprising:
- a plurality of said inserts each having a cover engaged thereon;
- any of said plurality of inserts positionable to said as-used position;
- each of said plurality of inserts having a respective said scent body impregnated with a different scent; and
- each of said plurality employable by a user desiring to employ a chosen respective scent in said as-used position.

9. The interchangeable hunting scent cartridge system of claim 4 additionally comprising:
- a plurality of said inserts each having a cover engaged thereon;
- any of said plurality of inserts positionable to said as-used position;
- each of said plurality of inserts having a respective said scent body impregnated with a different scent; and
- each of said plurality employable by a user desiring to employ a chosen respective scent in said as-used position.

10. The interchangeable hunting scent cartridge system of claim 5 additionally comprising:
- a plurality of said inserts each having a cover engaged thereon;
- any of said plurality of inserts positionable to said as-used position;
- each of said plurality of inserts having a respective said scent body impregnated with a different scent; and
- each of said plurality employable by a user desiring to employ a chosen respective scent in said as-used position.

* * * * *